United States Patent
Osajima et al.

(10) Patent No.: US 6,821,481 B1
(45) Date of Patent: Nov. 23, 2004

(54) CONTINUOUS PROCESSING METHOD AND CONTINUOUS PROCESSING APPARATUS FOR LIQUID-FORM SUBSTANCE, AND LIQUID-FORM SUBSTANCE PROCESSED THEREBY

(75) Inventors: Yutaka Osajima, Shobara (JP); Mitsuya Shimoda, Fukuoka-ken (JP); Masaki Miyake, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 791 days.

(21) Appl. No.: 09/684,433

(22) Filed: Oct. 10, 2000

(30) Foreign Application Priority Data

Apr. 27, 2000 (JP) ..................................... 2000-127082

(51) Int. Cl.$^7$ ................................................ C02F 1/50
(52) U.S. Cl. ........................ 422/28; 422/31; 422/32; 422/33; 422/260; 261/DIG. 7; 99/323.2; 210/764

(58) Field of Search ............................... 422/5, 28, 31, 422/32, 260, 33; 261/DIG. 7; 99/323.2; 210/750, 764, 188, 199, 205, 252

(56) References Cited

U.S. PATENT DOCUMENTS

| | | | |
|---|---|---|---|
| 5,704,276 A | * | 1/1998 | Osajima et al. ............ 99/323.2 |
| 6,384,090 B2 | * | 5/2002 | Riede et al. .................. 516/31 |
| 6,616,849 B1 | * | 9/2003 | Osajima et al. ............. 210/750 |

* cited by examiner

*Primary Examiner*—Elizabeth McKane

(57) ABSTRACT

A continuous processing apparatus includes a dissolution section for dissolving liquid carbon dioxide into a continuously supplied liquid-form raw material, and a processing section for holding the liquid-form raw material with liquid carbon dioxide dissolved therein under predetermined temperature and pressure to thereby transform carbon dioxide into a supercritical or subcritical state. Thus, bacteria, enzyme and the like contained in the liquid-form raw material can be effectively killed or decreased.

14 Claims, 8 Drawing Sheets

Fig. 2

| kind of enzymes | remaining activity (%) | | |
|---|---|---|---|
| | present example | comparative example 1 | comparative example 2 |
| pectin esterase | 8.0 | 9.2 | 12.4 |
| glucoamylase | 13.5 | 12.1 | 14.7 |
| acid protease | 7.8 | 9.3 | 12.7 |
| carboxypeptidase | 3.7 | 4.2 | 4.9 |
| lipase | 2.4 | 3.3 | 5.9 |
| α-amylase | 6.1 | 5.6 | 8.5 |
| β-amylase | 4.9 | 4.4 | 7.7 |

Fig. 4
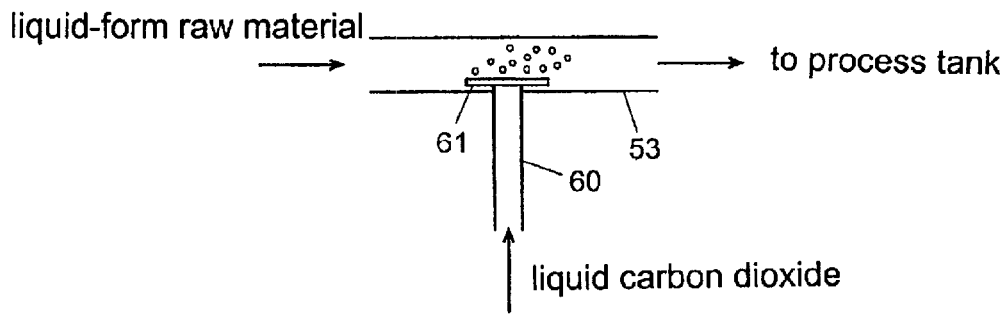
Fig. 5(a)
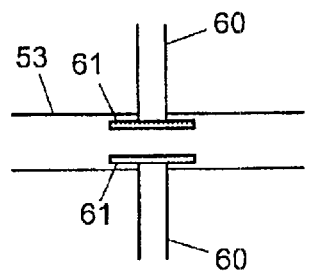
Fig. 5(b)
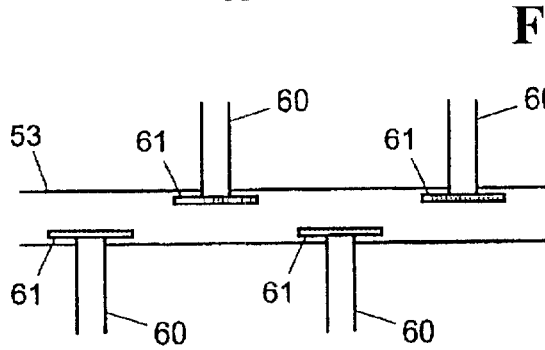
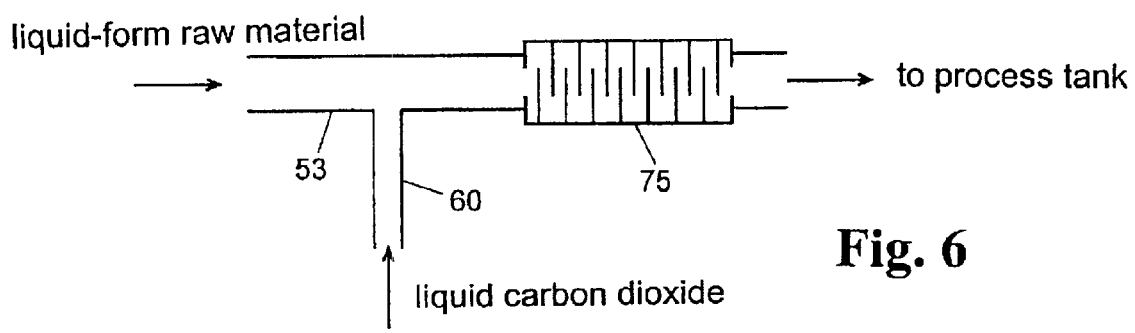
Fig. 6

CONTINUOUS PROCESSING METHOD AND CONTINUOUS PROCESSING APPARATUS FOR LIQUID-FORM SUBSTANCE, AND LIQUID-FORM SUBSTANCE PROCESSED THEREBY

BACKGROUND OF THE INVENTION AND RELATED ART STATEMENT

The invention relates to a continuous processing method and a continuous processing apparatus for continuously carrying out deactivation and sterilization processes of enzymes and spores of liquid-form foods and liquid-form medical supplies, or deodorization process of the liquid-form foods or the like, by using a supercritical or subcritical fluid, and a liquid substance, such as liquid-form food or drink and liquid-form medical supply, obtained by the above method and apparatus.

There are various kinds of liquid-form foods containing enzymes, typically such as refined sake, beer and fruit juice. A manufacturing process of the refined sake includes a first step wherein young sake is obtained by carrying out compression and filtration after completion of a fermentation; a second step wherein the obtained young sake is heated and sterilized, and then stored; a third step wherein the obtained original sake is mixed to determine its quality, and at the same time, to allow its alcoholic content to match the standard; and a fourth step wherein the adjusted sake is again heated to sterilize and filled in a bottle or a paper pack. As described above, in the refined sake which has been subjected to two times of heating processes, the enzymes are deactivated and sterilized, so that the quality of the refined sake during its distribution can be prevented from being deteriorated. However, such a heating process extremely reduces a fresh flavor and taste of the young sake. Therefore, in order to enjoy such fresh flavor and taste, there has been produced a green or fresh sake wherein the heating process is not carried out. The fresh sake is distributed at a cold temperature in order to protect its quality. However, such a fresh sake which has not been subjected to the heating process is liable to deteriorate in its quality due to actions of enzymes, such as an α-amylase, protease or the like. Further, there is a problem that its cost is raised because of the cold temperature distribution.

Also, in order to keep a stability of a turbid juice, such as orange juice, inactivation of pectinesterase is required. Since the pectinesterase is a stable enzyme against heat, in order to carry out inactivation of the pectinesterase by heating, a heat process under the condition of a high temperature in the order of 88 to 99° C. or 120° C., is required. However, when the heat process under such a high temperature is carried out, the flavor of the juice may be deteriorated.

In view of the problems as described above, the present inventors have already proposed a novel technique wherein an enzyme contained in a liquid-form food is subjected to contact with a supercritical state carbon dioxide to thereby deactivate the enzymes (Japanese Patent Publication (KOKAI) 7-170965). According to the technique, an enzyme contained in the liquid-form food is stored in a process tank and sealed; an interior of the sealed tank is held under the condition of a predetermined temperature and pressure; and a supercritical fluid of carbon dioxide is supplied into the process tank through a filter to form a fine size, i.e. average diameter less than several hundreds μm, so that the supercritical fluid can be easily dissolved in the liquid-form food. According to the method, enzyme can be effectively deactivated, and at the same time, since only carbon dioxide contacts the food, there is an advantage that a high safety can be obtained. Also, according to the method, microorganisms, such as bacteria, yeast and mold, can be sterilized at the same time.

Further, the present inventors have proposed a continuous processing apparatus for carrying out the deactivation and sterilization process effectively without deterioration of quality of products (Japanese Patent Publication (KOKAI) 9-206044, U.S. Pat. No. 5,704,276). In the continuous processing apparatus, a liquid-form food is continuously supplied to a bottom portion of the process tank held at a predetermined pressure and temperature; at the same time, supercritical state carbon dioxide is continuously supplied to the bottom portion of the process tank through a mesh-type filter disposed thereat; and a liquid outlet is provided at an upper portion of the process tank in the vicinity under a liquid-surface to thereby collect a product. The liquid-form food and the fine bubble-form supercritical fluid contact each other while making a parallel flow in an elevating direction in the process tank to thereby effectively deactivate enzymes. Also, a supercritical fluid discharge port is disposed at an upper portion of the process tank, through which the supercritical fluid is taken out and returned to a carbon dioxide supply source to reuse. According to the apparatus, since the liquid-form food can be continuously processed, the apparatus is suitable for a factory which processes a large amount of drinks or foods.

According to the above explained continuous processing apparatus, the deactivation and sterilization process of enzymes can be continuously carried out highly efficiently. However, in case the continuous processing apparatus is to be used practically, there is a problem, especially, in its cost. More specifically, in the above continuous processing apparatus, it is required that the process tank is held at a temperature higher than 31.1° C. in order to hold carbon dioxide in a supercritical state. However, a solubility of carbon dioxide into the liquid-form food becomes lower as the temperature becomes higher. Thus, in view of dissolution, its efficiency is poor. Therefore, in order to obtain sufficient deactivation and sterilization effects, it is required that the liquid-form food and the supercritical fluid are subjected to a parallel flow for a predetermined time in the order of several to several tens of minutes. Therefore, it is necessary to shorten time by making the process tank in a large capacity. Also, in order to hold the process tank at the above-stated temperature, it is required to provide a heater. Further, since a reaction in the process tank becomes slow when a temperature of the liquid-form food supplied to the process tank is low, a heater for properly heating the liquid-form food is required before the food is supplied to the process tank. As described above, the continuous process apparatus requires an equipment on a large scale, which results in a large occupancy area as well as a high cost.

Also, the temperature in the process tank is considerably lower than that for deactivating enzymes by heating, but higher than the room temperature. Thus, in case the liquid-form food is left as it is under such a temperature condition for the predetermined time, the quality of the liquid-form food may be deteriorated. More specifically, for example, a citrus juice right after squeezed contains high active enzymes, so that the enzymes may act on the juice in the process tank before the enzymes are deactivated to deteriorate a quality of the juice.

To solve these problems, the present invention has been made, and an object of the invention is to provide a continuous processing method, a continuous processing apparatus and a liquid-form substance processed thereby, wherein a process tank can be miniaturized and the number of heaters to be disposed can be minimized.

Further objects and advantages of the invention will be apparent from the following description of the invention.

SUMMARY OF THE INVENTION

In the continuous processing apparatus disclosed in the previous application, a step for dissolving carbon dioxide in a liquid-form food and a step for allowing carbon dioxide to be a supercritical state and holding in its state, are carried out in a process tank simultaneously. On the contrary, in a continuous processing method and a continuous processing apparatus according to the present invention for solving the above problems, two processes disclosed in the previous application are carried out separately timewise and spacewise.

More specifically, in the continuous processing method according to the present invention, a liquid-form raw material, such as a liquid-form food, is continuously subjected to a process by using a supercritical or subcritical fluid. The method includes a dissolution step for continuously supplying liquid carbon dioxide to a continuously supplied liquid-form raw material to thereby dissolve liquid carbon dioxide in the liquid-form raw material; a holding step for holding the liquid-form raw material, for a predetermined time, into which the liquid carbon dioxide has been dissolved at the dissolution process; a critical process step for holding the liquid-form raw material into which the liquid carbon dioxide has been dissolved under predetermined temperature and pressure conditions to thereby allow carbon dioxide to be a supercritical or subcritical state; and a decompressing step for suddenly decompressing the liquid-form raw material having passed through the critical process step to thereby remove carbon dioxide and collect a product.

In a continuous processing apparatus of the present invention embodying the above continuous processing method, a liquid-form raw material, such as a liquid-form food, is continuously processed by using a supercritical or subcritical fluid. The apparatus includes a raw material supply path or section for continuously supplying a liquid-form raw material; a carbon dioxide supply path or section for continuously supplying liquefied carbon dioxide; a dissolution portion or section for dissolving liquid carbon dioxide supplied through the carbon dioxide supply path in the liquid-form raw material supplied through the raw material supply path; a holding portion or section for holding, for a predetermined time, the liquid-form raw material into which the liquid carbon dioxide has been dissolved; a critical process portion or section for taking out the liquid-form raw material, into which the liquid carbon dioxide has been dissolved, from the dissolution portion and holding it under predetermined temperature and pressure conditions to thereby allow carbon dioxide to be a supercritical or subcritical state; and a decompressing portion or section for suddenly decompressing the liquid-form raw material having passed through the critical process portion to remove carbon dioxide and collecting a product.

Further, a liquid-form substance according to the present invention is a liquid-form substance processed and collected by the above-stated continuous processing method or continuous processing apparatus.

In the continuous processing method and continuous processing apparatus according to the present invention, while the liquid-form raw material, such as liquid-form food and liquid-form chemical, is continuously supplied to the dissolution portion through the raw material supply path, cooled and liquefied carbon dioxide, (hereinafter referred to "liquid carbon dioxide") is continuously supplied to the dissolution portion through the carbon dioxide supply path. A mesh-type filter having fine holes, for example, is disposed at an outlet of the carbon dioxide supply path, and when passing through the filter, liquid carbon dioxide becomes fine bubbles to thereby dissolve into the liquid-form raw material. Of course, a contact efficiency of carbon dioxide and the liquid-form raw material may be increased by other methods, such as a high speed mixer and an ultrasonic wave generator. As is generally known, a solubility of liquid carbon dioxide into a liquid becomes higher as the circumferential temperature is lower. Therefore, while it is desirable that the solution portion is cooled, even if the temperature thereof is the room temperature, a sufficient quantity of liquid carbon dioxide can be dissolved in the liquid-form raw material for a short time. Especially, in a winter season, since the ambient temperature is low, the solubility efficiency is high.

For example, the dissolution portion includes a solution tank, and an inlet of the liquid-form raw material from the raw material supply path and an inlet of liquid carbon dioxide from the carbon dioxide supply path are disposed at a bottom portion of the solution tank, and an outlet for taking out the liquid can be located in the vicinity of a liquid surface at an upper portion of the solution tank. According to the structure, the liquid-form raw material introduced through the bottom portion of the solution tank flows in the solution tank to elevate therethrough, and bubble-shape liquid carbon dioxide also flows in the same direction. Thus, contact areas thereof are extremely wide, so that liquid carbon dioxide can be effectively dissolved in the liquid-form raw material.

Also, the above dissolution portion may be structured such that liquid carbon dioxide is dissolved in the liquid-form raw material by supplying liquid carbon dioxide into the liquid-form raw material flowing through a raw material supply pipe used as a raw material supply path. As described above, in case carbon dioxide is dissolved in the liquid-form raw material in the raw material supply pipe, it is not required to provide a special tank for dissolving carbon dioxide on the way of the raw material supply pipe to thereby miniaturize the whole apparatus.

As a method for effectively dissolving liquid carbon dioxide into the liquid-form raw material flowing in the raw material supply pipe, there are, for example, a method wherein a mesh-type filter is disposed in the raw material supply pipe to allow carbon dioxide to pass therethrough, so that fine bubbles of liquid carbon dioxide are released in the liquid-form raw material; and a method wherein a mixer for mixing liquids is provided on the way of the raw material supply pipe, and liquid carbon dioxide is supplied to the liquid-form raw material on an upstream side than the mixer. Incidentally, as stated above, since the solubility of liquid carbon dioxide into a liquid becomes higher as an ambient temperature becomes lower, it is preferable to cool a portion of the raw material supply pipe where the filter or mixer is provided. However, at this time, it is not always necessary to cool the raw material supply pipe to a specially lower temperature. For example, even if it is the room temperature, a sufficient amount of liquid carbon dioxide can be dissolved in the liquid-form raw material for a short time. Especially, in a winter season, since the ambient temperature is low, the dissolving efficiency is high. Therefore, for example, it is effective only to provide a device for keeping the above-stated portions warm.

The liquid-form raw material into which liquid carbon dioxide has been dissolved at the dissolution portion is sent to the holding portion. The holding portion is structured such that liquid carbon dioxide can act therein on enzymes or microorganisms to be processed in the liquid-form raw material for a sufficiently long time. A temperature of the holding portion is set at a temperature lower than that of the critical process portion, described later, for example, substantially the same temperature as that of the solution portion. As a specific shape of the holding portion, for example, there are mentioned a spiral pipe; a tank having a sufficient capacity with respect to a flow quantity of the liquid-form raw material; a tank provided with a baffle therein; a tank provided with a spiral screw structure on an inner wall surface; and a tank provided with a screw-type structure therein. Or, a tank is divided into two chambers by a partition or like, one chamber on the upstream side may constitute the dissolution portion and the other chamber on the downstream side may constitute the holding portion. In case the holding portion is provided, since the liquid carbon dioxide is sufficiently penetrated into protein for constituting objects to be processed, such as enzymes and microorganisms, for example, even if bacteria is strong, the strong bacteria can be positively killed in the critical process step and decompression step, described later.

Incidentally, as a flow path for sending the liquid-form raw material to the critical process portion, described later, from the dissolution portion, in addition to a first flow path passing through the holding portion, a second flow path which does not pass through the holding portion may be provided separately, so that either one of the flow paths can be selected according to a kind of the process or a kind of an object to be processed. Further, the holding portion may be formed of a plurality of independently operable holding units, and one, a part or all of the holding units may be operated as occasion arises.

The liquid-form raw material into which liquid carbon dioxide has been dissolved at the dissolution portion is sent to the next critical process portion. The critical process portion is held under the condition of a temperature and pressure required for converting carbon dioxide in a supercritical or subcritical state. As such a condition, it is preferable to hold a temperature of 30 to 80° C., preferably 30 to 50° C. and a pressure of 40 to 400 atm, preferably 100 to 300 atm. Under the condition, liquid carbon dioxide dissolved in the liquid-form raw material is suddenly changed to the supercritical or subcritical state. It is sufficient that a holding time of the liquid-form raw material in the heating tank is at the most in the order of one minute. Therefore, although the temperature is higher than the room temperature, deterioration of a quality of the liquid-form raw material can be suppressed to the minimum.

Next, in the decompression step carried out at the decompression portion, the pressure of the liquid-form raw material subjected to the above process at the critical process portion is suddenly reduced, so that carbon dioxide having penetrated into protein as an active substance of the enzymes is suddenly expanded and protein is destructed to deactivate the enzymes. Also, sterilization of various microorganisms can be carried out. Since carbon dioxide dissolved in the liquid-form raw material is vaporized and volatilized from the liquid-form raw material, the liquid-form raw material can be collected as a product after the process. In such a decompression process, a decompression speed is important. For example, in case the decompression is carried out by using a pressure controlling valve with an orifice, it is preferable to set the decompression speed such that the liquid-form raw material passes through the orifice at a speed of less than 20 msec, preferably less than 10 msec.

Incidentally, as the liquid-form raw material to which the present invention is applied, a fermentation/brewing liquid-form foods, such as raw sake, beer, wine and soy source, various fruit juices and soft drinks, are typically mentioned. Although the fruits juices are generally produced from apples, grapes and various citruses as raw materials, squeezed liquids produced from tomatoes and other vegetables as raw materials may be included. Also, the liquid-form raw material may not be foods, and it may be a liquid-form chemical, such as various infusions, blood formulations and nutrition supply liquids.

As described hereinabove, according to the continuous processing method and continuous processing apparatus of a liquid-form substance of the prevent invention, since the dissolution step of liquid carbon dioxide into the liquid-form raw material and the critical process step for changing carbon dioxide into a supercritical or subcritical state are separated, the respective steps can be extremely effectively carried out, so that the overall process time can be greatly shortened when compared with those of the conventional continuous processing methods and apparatuses. Therefore, a large process tank and a heater for heating the liquid-form raw material are not required, so that the apparatus can be miniaturized. Also, since the temperature setting at the critical process step can be optimized, higher effects of deactivation/sterilization of the enzymes can be obtained when compared with those in the prior art. Further, since the time for which the liquid-form raw material is held in a warm state is short, the flavor of the product is not substantially deteriorated.

BRIEF DESCRIPTION OF THE DRAWINGS

FIG. 2 is a table showing results obtained by testing ratios of active enzymes remaining in the liquid-form raw material processed by the apparatus as shown in FIG. 1;

FIG. 4 is an enlarged view of a portion enclosed by a rectangle R shown in FIG. 3, wherein a filter is disposed in a raw material supply pipe;

FIGS. 5(a) and 5(b) are diagrams showing a plurality of filters disposed in a raw material supply pipe, respectively;

FIG. 6 is a block diagram showing a solution acceleration mechanism structured by using a stationary-type mixer;

DETAILED DESCRIPTION OF PREFERRED EMBODIMENTS

Hereunder, embodiments of continuous processing apparatuses according to the present invention are explained with reference to the accompanying drawings.

Figure 1:
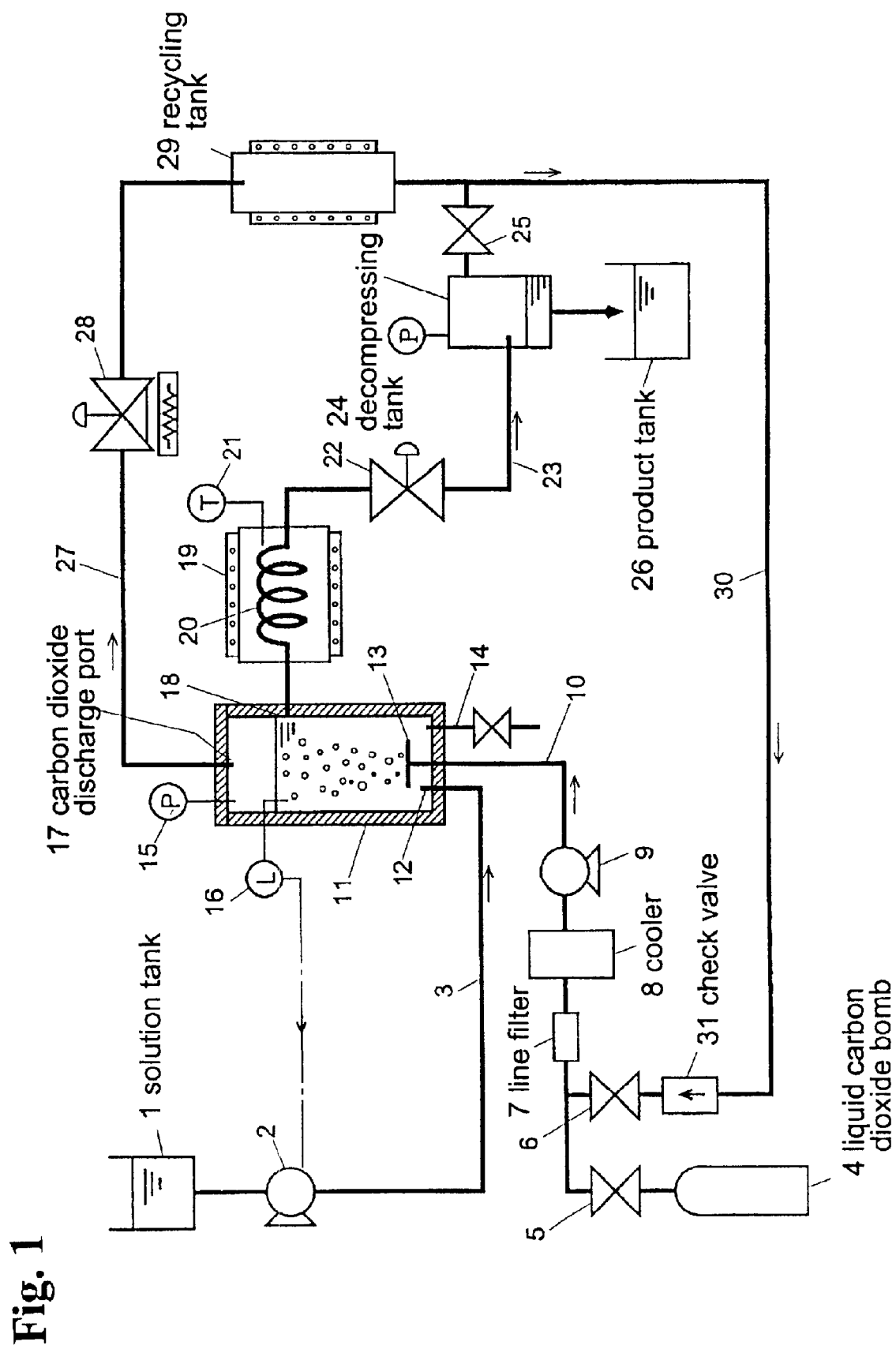
FIG. 1 is a block diagram showing a structure of an embodiment of a continuous enzyme deactivation processing apparatus according to the present invention.

FIG. 1 is a block diagram showing a continuous enzyme deactivation processing apparatus. In the apparatus, a liquid-form raw material is stored in a raw material tank 1, and a bottom of the raw material tank 1 and a bottom of a solution tank 11 are connected by a raw material supply path 3. In the middle of the raw material supply path 3, there is provided a pump 2 for sending the liquid-form raw material while pressurizing, and the liquid-form raw material is continuously supplied to the solution tank 11 at a desired flow rate by suitably setting an operating condition of the pump 2.

On the other hand, between a liquid carbon dioxide bomb 4 and the bottom of the solution tank 11, there is extended a carbon dioxide supply path 10 provided with a valve 5, line filter 7, cooler 8 and pump 9. The cooler 8 is provided to cool and liquefy gaseous carbon dioxide supplied through a recycling path 30, described later, or in case carbon dioxide is vaporized in the supply path 10, and carbon dioxide held in a liquid state is pressurized by the pump 9 to be supplied to the solution tank 11.

The solution tank 11 is formed of a vessel for withstanding pressure, and an outlet of the raw material supply path 3 disposed to the bottom portion thereof is provided with an introduction port 12, and an outlet of the carbon dioxide supply path 10 is provided with a mesh-type filter 13 having fine holes. In order to effectively dissolving liquid carbon dioxide in the liquid-form raw material, it is preferable to release liquid carbon dioxide in the raw material as the finest particles. Thus, it is preferable that a mesh of the filter 13 is in a range of less than 100 $\mu$m, preferably less than 20 $\mu$m. A drain 14 for a waste liquid, which can be freely closed and opened by a valve, is connected to the bottom of the solution tank 11. On the other hand, a liquid outlet 18 is disposed in the vicinity of a liquid surface on an upper portion in the solution tank 11. In other words, the liquid-form raw material introduced through the introduction port 12 flows upward in the solution tank 11, and when the liquid-form raw material reaches in the vicinity of the liquid surface, the raw material is taken out through the liquid outlet 18.

A liquid level sensor 16 is provided in the solution tank 11, and the liquid level in the solution tank 11 is held substantially constant by feeding back an output signal of the liquid level sensor 16 to the pump 2 to thereby control its operation. Incidentally, instead of the liquid level sensor 16, for example, there may be employed a controlling device for equalizing a liquid quantity taken out from the liquid outlet 18 with a liquid quantity to be supplied from the introduction port 12 so as to hold the liquid level in the solution tank 11 constant. As described above, by holding the liquid level constant, since a time for the liquid-form raw material to pass through the solution tank 11 can be maintained constant, carbon dioxide can be stably and uniformly dissolved in the liquid-form raw material, as described later.

A carbon dioxide discharge port 17 is disposed at a lid portion for closing an upper end surface of the solution tank 11. While liquid carbon dioxide is dissolved in the liquid-form raw material in the solution tank 11 as described later, according to the condition, a part of liquid carbon dioxide may change to a subcritical state or a supercritical state. In that case, since a density of the subcritical or supercritical fluid is less than that of a liquid, carbon dioxide in the subcritical state or the supercritical state can be taken out through the carbon dioxide discharge portion 17 positioned at a level higher than the liquid surface.

A spiral heating wire 20 is connected to the liquid outlet 18. The heating wire 20 is held in a warming tank, or a warming metal block, provided with a heater 19, and a temperature of the heating wire 20 can be monitored by a temperature sensor 21. The temperature monitored by the temperature sensor 21 is fed back to the heater 19 to thereby hold the temperature of the heating wire 20 substantially constant.

On the other hand, a pressure in the solution tank 11 is monitored by a pressure sensor 15. Since the solution tank 11 and the heating wire 20 are disposed between the pumps 2, 9 and the pressure controlling valves 22, 28, the pressure in the solution tank 11 can be controlled to a predetermined pressure value by supply speeds of the liquid-form raw material and liquid carbon dioxide by the pumps 2, 9 and opening degrees of the pressure controlling valves 22, 28.

A product collecting path 23 having the pressure controlling valve 22 for attaining a quick decompression on its way is connected at one end to an outlet of the heating wire 20, and at the other end to a decompression tank 24. In the decompression tank 24, carbon dioxide having dissolved in a product, i.e. processed liquid-form raw material, is vaporized to take out, and gaseous carbon dioxide can be returned to a recycling path 30 through a valve 25. The product collected in the decompression tank 24 is transferred to a product tank 26. Incidentally, since vaporization heat is removed when carbon dioxide is vaporized in the decompression tank 24, the liquid-form raw material warmed in the heating wiring 20 is cooled in the decompression tank 24 to thereby obtain a product of a room temperature or lower temperature.

A carbon dioxide collecting path 27 is connected to the carbon dioxide discharge port 17 at one end, and the other end thereof is connected to a recycling tank 29 through a pressure controlling valve 28. The supercritical or subcritical fluid sent to the carbon dioxide collecting path 27 is decompressed at the pressure controlling valve 28 to be a gaseous carbon dioxide and collected in the recycling tank 29. The recycling path 30 is connected to the recycling tank 29 at one end, and the other end thereof is connected to the carbon dioxide supply path 10 through a check valve 31 and the valve 6 so that the recycling tank 29 functions as another carbon dioxide supplying source. In other words, only an insufficient amount of carbon dioxide recycled through the recycling path 30 is supplied from the liquid carbon dioxide bomb 4 to thereby save a quantity of the carbon dioxide supplied therefrom.

Next, the deactivation process of enzymes in the above apparatus is explained. The liquid-form raw material is continuously introduced into the solution tank 11 through the introduction port 12. When liquid carbon dioxide sent through the carbon dioxide supply path 10 passes through the filter 13, carbon dioxide is released into the liquid-form raw material as fine bubbles according to a diameter of holes of the filter 13. In other words, the liquid in a form of fine bubbles introduced through the filter 13 and the liquid-form raw material right after introduction immediately contact with each other, so that liquid carbon dioxide is effectively dissolved into the liquid-form raw material. Since dissolution is accelerated as an ambient temperature becomes lower, it is preferable to cool the solution tank 11. However, by only placing the solution tank 11 in a room temperature, a sufficiently high solubility can be obtained.

The liquid-form raw material, in which liquid carbon dioxide has been dissolved, rises in the solution tank 11 and reaches the liquid outlet 18. In order to obtain sufficient enzyme deactivation and sterilization effects, it is preferable to increase a solubility of carbon dioxide with respect to the liquid-form raw material as much as possible. Also, in case bacteria having a strong life force is designed to be killed, it is important to take a sufficient time for allowing liquid carbon dioxide to act on the bacteria in the liquid-form raw material. A structure for prolonging an acting time of liquid carbon dioxide is explained later.

The liquid-form raw material taken out from the liquid outlet 18 is introduced into the heating wire 20. At this time, although liquid carbon dioxide, which is not dissolved in the liquid-form raw material, i.e. in a mixed state, may also be introduced into the heating wire 20, nothing is wrong. The heating wire 20 is held at a temperature in the order of 30 to 40° C. by the heater 19. A pressure in the heating wire 20 and the solution tank 11 is held at 100 to 300 atm. Under such temperature and pressure conditions, liquid carbon dioxide is changed to a supercritical fluid in a short time. The liquid-form raw material passes through the spiral heating wire 20 for about one minute. When liquid carbon dioxide having dissolved in the liquid-form raw material is transformed into the supercritical fluid, a portion of protein which is an active substance of the enzymes contained in the liquid-form raw material is destructed to thereby cause a portion of the microorganisms to die out. However, at this point, the effect thereof can be found only partially.

Then, when the liquid-form raw material reaches the decompression tank 24 through the pressure controlling valve 22, the pressure is suddenly lowered to thereby release the supercritical state, and carbon dioxide is vaporized at a stroke to suddenly be subjected to an expansion in volume. At that time, protein of the enzymes is destructed to thereby cause the microorganisms to die out. Thus, the deactivation of the enzymes and spores and sterilization of the microorganisms can be carried out, and the processed product is collected into the product tank 26. As a result, the product collected in the product tank 26 has an extremely low active enzyme ratio so that undesired microorganisms become zero. Also, as described before, the temperature of the product at the time of collection is low. Also, since heat is not added when carbon dioxide is vaporized at the decompression tank 24, a flavor component itself contained in the liquid-form raw material does not substantially volatilize, so that the flavor is not spoiled or lost.

Next, enzyme deactivation effects obtained through an experiment using the continuous enzyme deactivation process apparatus as shown in FIG. 1 are explained. FIG. 2 shows results obtained by examining ratios of the active enzymes remaining in the liquid-form raw material processed by the apparatus as shown in FIG. 1. As Comparative Examples, there are shown processing results obtained by using a continuous processing apparatus, i.e. the apparatus disclosed in Japanese Patent Publication (KOKAI) 9-206044 as described before, wherein a conventional subcritical and supercritical fluid is used (Comparative Example 1); and processing results obtained by a heat processing method which is generally used at present (Comparative Example 2).

In the experiments, the liquid-form raw material was supplied at a ratio of 20 Kg/h, and carbon dioxide was supplied at a ratio of 1.6 kg/h. In the Present Example of the invention, a critical processing step was carried out for one minute at a temperature of 50° C. under a pressure of 250 atm. On the other hand, at Comparative Example 1, a critical processing step was carried out for 15 minutes at a temperature of 40° C. under a pressure of 250 atm; and at Comparative Example 2, a heat processing was carried out for one minute at a temperature of 85° C.

As apparent from FIG. 2, two methods using the subcritical and supercritical fluid, i.e. the Present Example and Comparative Example 1, show enzyme deactivation effects higher than that of the heat processing method of Comparative Example 2. Also, there is no significant difference between the deactivation effects of the Present Example and Comparative Example 1. In other words, by the processing method according to the present invention wherein the critical processing step was carried out in a very short time, such as only one minute, there can be obtained the same deactivation effect as that of Comparative Example 1 wherein the critical processing step requires 15 minutes.

At the same time as the above experiment, the remaining spore number of ascospore microbe was also examined, and it was confirmed that remaining spore number including *Bacillus subtilis* and eight other bacteria of Bacillus was zero. In other words, by the processing method according to the present invention, microorganisms can be completely sterilized.

Also, in case there is structured an apparatus for processing a liquid-form raw material, such as fruit juices, wherein its flavor component is desired to be held as much as possible, there may be provided a path for returning at least a part of carbon dioxide in the supercritical state taken out from the carbon dioxide discharge port 17 to the decompression tank 24, separately. When carbon dioxide in the supercritical state flowing into the decompression tank 24 through the path is vaporized therein, the flavor component taken in carbon dioxide in the solution tank 11 is released. The flavor component is dissolved again in the product collected in the decompression tank 24. Thus, the collected product contains much more flavor component.

Figure 3:
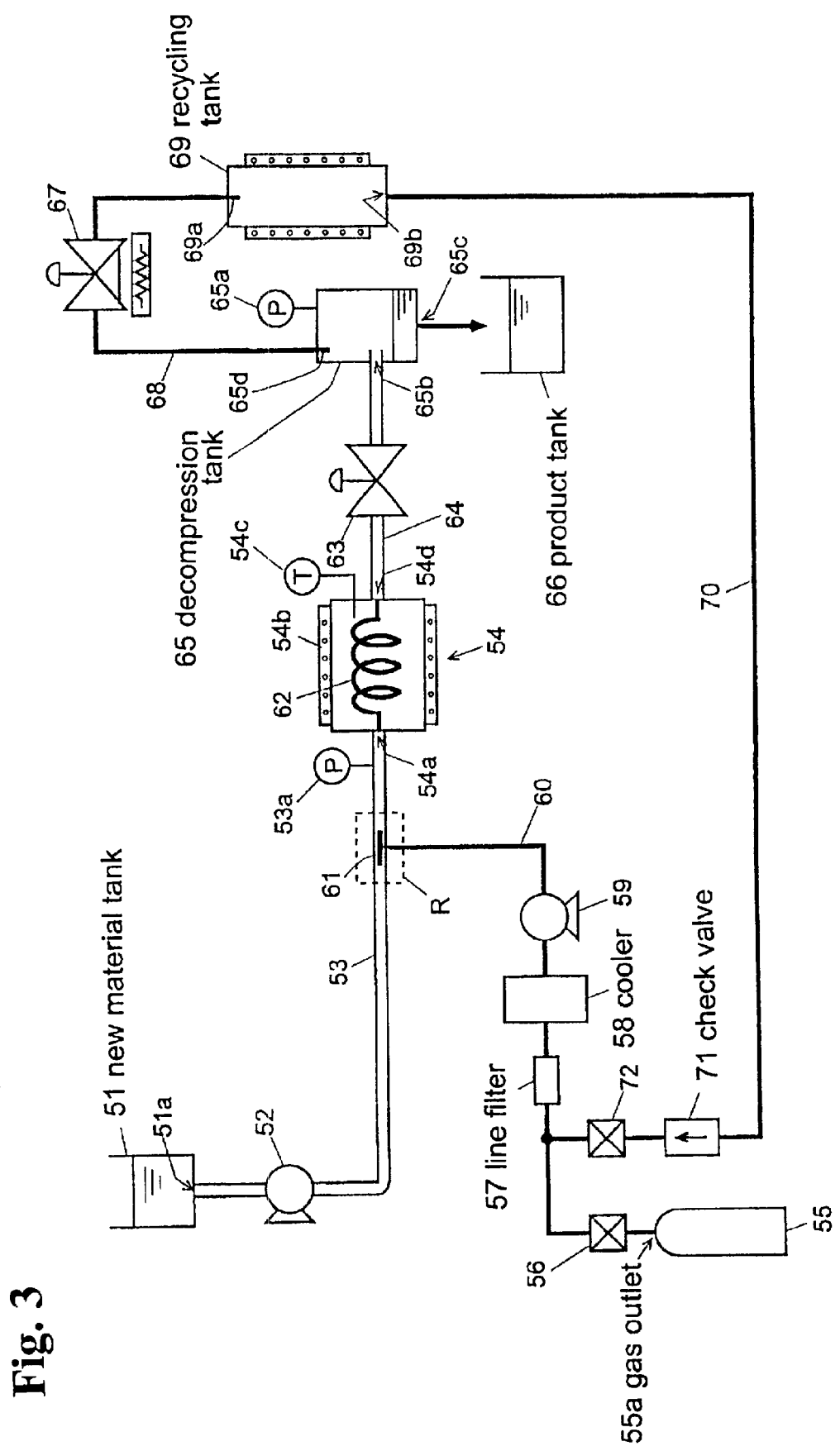
FIG. 3 is a block diagram showing a structure of another embodiment of a continuous enzyme deactivation processing apparatus according to the present invention.

FIG. 3 is a block diagram showing another continuous enzyme deactivation processing apparatus, and FIG. 4 is an enlarged view of a portion surrounded by a rectangle R in FIG. 3.

In the apparatus shown in FIG. 3, a liquid-form raw material to be processed is stored in a raw material tank 51 having a liquid outlet 51a. The liquid outlet 51a of the raw material tank 51 is connected to a liquid inlet 54a of a processing unit 54 through a raw material supply pipe 53, on the way of which a pump 52 is disposed. On the other hand, liquid carbon dioxide to be used for processing the raw material is stored in a bomb 55. One end, i.e. an inlet end, of a carbon dioxide supply path 60, on the way of which a valve 56, line filter 57, cooler 58 and pump 59 are disposed, is connected to a gas outlet 55a of the bomb 55. The other end, i.e. outlet end, of the carbon dioxide supply path 60 is inserted into the raw material supply pipe 53 to penetrate through a side wall thereof. A mesh-type filter 61 having fine holes is provided in the vicinity of the outlet end of the carbon dioxide supply path 60. Also, the raw material supply pipe 53 is provided with a pressure sensor 53a for detecting a pressure therein in the vicinity of the liquid inlet 54a of the processing unit 54.

The processing unit 54 is a warming tank including a heater 54b and a temperature sensor 54c, and has a spiral heating wire 62 therein. One end of the heating wire 62 is connected to the liquid inlet 54a and the other end thereof is connected to a liquid outlet 54d of the processing unit 54. The liquid outlet 54d of the processing unit 54 is connected to one end of a product collecting path 64 having a pressure controlling valve 63. The other end of the product collecting path 64 is connected into a liquid inlet 65b provided to a side wall of a decompression tank 65 having a pressure sensor 65a. A product outlet 65c is provided at a bottom portion of the decompression tank 65, and right under thereof, a product tank 66 is located. A carbon dioxide discharge port

65d is located on an upper portion of the decompression tank 65, and one end of a carbon dioxide collecting path 68 provided with a pressure controlling valve 67 on the way is connected to the carbon-dioxide discharge port 65d. The other end of the carbon dioxide collecting path 68 is connected to a gas inlet 69a provided at an upper portion of a recycling tank 69. A gas outlet 69b is provided at a bottom portion of the recycling tank 69, to which one end of a recycling path 70 is connected. A check valve 71 and a valve 72 are disposed in the middle of the recycling path 70. The other end of the recycling path 70 is connected to the carbon dioxide supply path 60 between the valve 56 and the line filter 57.

Also, not shown, the above-described apparatus includes a controlling device for driving various portions of the apparatus based on output signals of the pressure sensor and the temperature sensor. For example, the controlling device functions as a temperature controlling device for holding a temperature in the processing unit 54 at a predetermined value by feed-back control of the heater 54b based on an output signal of the temperature sensor 54c. Also, the controlling device functions as a pressure controlling device for holding pressures in the heating wire 62 and the decompression tank 65 at predetermined values, respectively, by feed-back control of the pumps 52, 59 and the pressure controlling valves 63, 67 based on output signals of the pressure sensors 53a, 65a. In addition to the above, the controlling device further keeps a pressure in the raw material supply pipe 53, which is also a pressure in the heating wire 62, to be detected by the pressure sensor 53a, in the order of 100 to 300 atm, and at the same time, keeps a pressure in the decompression tank 65 to be detected by the pressure sensor 65a at a value of about 2–40 atm, further lower valve than that.

The operations of the above apparatus are as follows. First, when the apparatus is started, the valve 56 disposed on the carbon dioxide supply path 60 is opened, and the pumps 52, 59 are started. When the pump 52 starts, the liquid-form raw material stored in the raw material tank 51 is continuously supplied to the raw material supply pipe 53. When the pump 59 starts, liquid carbon dioxide stored in the bomb 55 is fed into the raw material supply pipe 53 through the carbon dioxide supply path 60. Here, for example, even if liquid carbon dioxide flowing out from the bomb 55 is vaporized in the carbon dioxide supply path 60, since the carbon dioxide gas is again liquefied by the cooler 58, liquid carbon dioxide is stably supplied to the raw material supply pipe 53.

Liquid carbon dioxide flowing through the carbon dioxide supply path 60 passes through the filter 61 when it flows out from the outlet end of the carbon dioxide supply path 60 to thereby become fine bubbles and dispersed in the liquid-form raw material (FIG. 4). Since the fine bubble-form liquid introduced through the filter 61 and the liquid-form raw material right after introduction immediately contact with each other, liquid carbon dioxide can be effectively dissolved in the liquid-form raw material. Incidentally, in order to effectively dissolve liquid carbon dioxide into the liquid-form raw material, it is preferable to release liquid carbon dioxide into the raw material as fine particles as much as possible. Thus, the mesh of the filter 61 is less than 100 $\mu$m, more preferably less than 20 $\mu$m. Generally, since gas is dissolved more in a liquid as a temperature becomes lower, it is preferable to cool at least a portion of the raw material supply pipe 53 where the filter 61 is provided therein. However, instead of specially cooling, for example, when the portion of the raw material supply pipe 53 where the filter 61 is provided is merely kept at a room temperature, a sufficiently high solubility can be obtained.

Incidentally, in FIG. 4, although only one filter 61 is disposed in the raw material supply pipe 53, a plurality of filters 61 may be provided. Such examples are shown in FIGS. 5(a) and 5(b). More specifically, in FIG. 5(a), two filters 61 are disposed in the raw material supply pipe 53 to face each other. In FIG. 5(b), four filters 61 are disposed alternately along a flowing direction of the raw material. With such an arrangement, a dissolving efficiency of liquid carbon dioxide can be further increased. Incidentally, pipes for feeding carbon dioxide to the respective filters 61 may be structured by, for example, diverging the carbon dioxide supply path 60 on the downstream side of the pump 59.

As described above, the liquid-form raw material into which liquid carbon dioxide has been dissolved is introduced into the heating wire 62 through the liquid inlet 54a of the processing unit 54. At this time, although liquid carbon dioxide which can not be dissolved in the liquid-form raw material, i.e. in a mixed state, may also be introduced into the heating wire 62, nothing is wrong. The heating wire 62 is held at a temperature in the order of 30 to 40° C. by the heater 64b. Also, a pressure in the heating wire 62 is held at 100 to 300 atm. Under such temperature and pressure conditions, liquid carbon dioxide is changed to a supercritical fluid in a short time. The liquid raw material passes through the spiral heating wire 62 at a speed in the order of one minute to several minutes. Through the change of liquid carbon dioxide dissolved in the liquid-form raw material into the supercritical fluid, a portion of protein as an active substance of enzymes contained in the liquid-form raw material is destructed to thereby allow a portion of the microorganisms to die out. However, at this point, the effect is limited partially.

The liquid-form raw material flowing out from the liquid outlet 54d of the processing unit 54 passes through the product collecting path 64 and flows into the decompression tank 65 through the pressure controlling valve 63. At this time, since the pressure is suddenly lowered, the supercritical state is released and carbon dioxide is vaporized at a stroke to thereby suddenly expand in volume. At that time, protein in the enzymes is destructed to thereby cause the microorganisms to die out. Thus, the deactivations of the enzymes and spores and sterilization of the microorganisms can be carried out. Also, when the decompression is carried out, the temperature of the liquid-form raw material is suddenly lowered to a room temperature or lower. The processed product thus obtained is taken out from the product outlet 65c and collected to the product tank 66. The product stored in the product tank 66 has an extremely low rate of active enzymes and no undesirable microorganisms. Also, since no heat is added when carbon dioxide is vaporized at the decompression tank 65, a flavor component itself contained in the liquid-form raw material does not substantially volatilize, so that the flavor is not spoiled or lost.

Incidentally, as described above, since carbon dioxide dissolved in the liquid-form raw material is vaporized by the decompression and almost all carbon dioxide is separated from the liquid-form raw material, the product taken out of the product outlet 65c contains an extremely small amount of carbon dioxide. However, according to a kind of the product, it is required to completely remove remaining carbon dioxide. In order to produce this type of product, a unit for subjecting the product taken out of the product outlet 65c to a deaeration process may be added at a later step. Such a deaeration unit can be structured by using a conventionally known deaeration method of a liquid, such as a decompressing method wherein a closed tank in which a liquid is sealed is evacuated to thereby take out gas from the liquid, or a centrifugation method.

Carbon dioxide vaporized in the decompression tank 65 as described above flows into the carbon dioxide collecting path 68 through the carbon dioxide discharge port 65d and is guided to the recycling tank 69 through the pressure controlling valve 67. After a sufficient quantity of carbon dioxide is collected in the recycling tank 69, when the valve 72 disposed on the recycling path 70 is opened, carbon dioxide stored in the recycling tank 69 is again fed to the raw material supply pipe 53 through the recycling path 70 and the carbon dioxide supply path 60. At this time, even if carbon dioxide is in a gaseous state in the recycling path 70, carbon dioxide is liquefied when it passes through the cooler 58 and supplied to the raw material supply pipe 53. As described above, the recycling tank 69 can be used as a second liquid carbon dioxide supply source. Therefore, for example, after a sufficient quantity of carbon dioxide is stored in the recycling tank 69, carbon dioxide stored in the recycling tank 69 is mainly used and only an insufficient quantity is taken out from the bomb 55 to thereby reduce a consumption of liquid carbon dioxide.

In the apparatus as shown in FIG. 3, although dissolution of liquid carbon dioxide into the liquid-form raw material is accelerated by allowing liquid carbon dioxide to be fine bubbles through the filter 61 disposed in the raw material supply pipe 53, there may be employed other acceleration methods for dissolving liquid carbon dioxide. FIG. 6 is a block diagram showing an example of a solution acceleration mechanism formed of a stationary-type mixer. In the mechanism, the stationary-type mixer 75 is located in the middle of the raw material supply pipe 53 on the downstream side of a connection portion of the raw material supply pipe 53 and the carbon dioxide supply path 60. Incidentally, in case the stationary-type mixer as described above is used, in order to raise a solution efficiency of liquid carbon dioxide, for example, a plurality of liquid carbon dioxide supplying pipes formed by diverging the carbon dioxide supply path 60 on the downstream side of the pump 59 is connected to the raw material supply pipe 53, so that liquid carbon dioxide is supplied to the raw material through the plural liquid carbon dioxide supplying portions.

Figure 7:
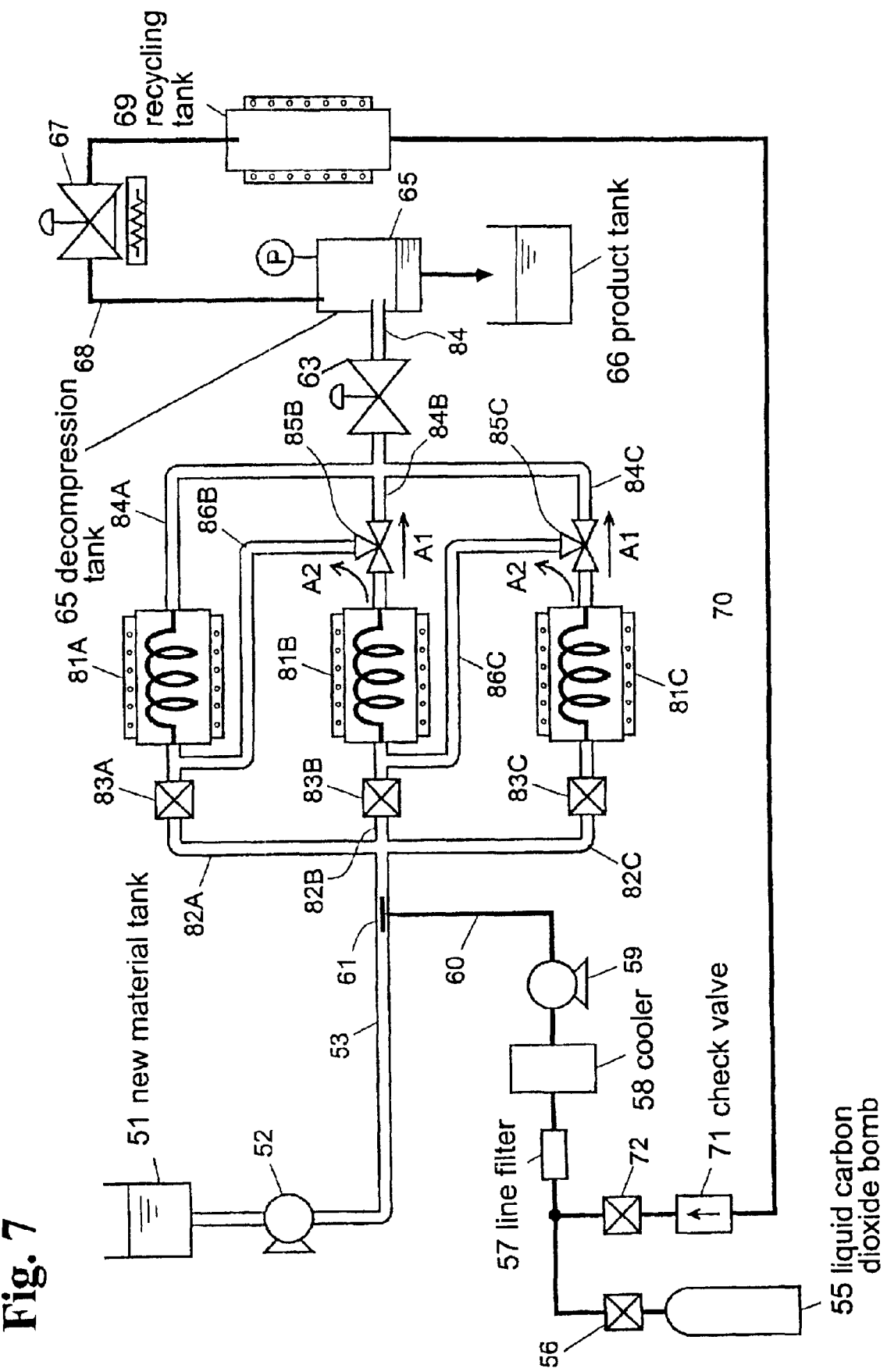
FIG. 7 is a block diagram showing an example of a continuous sterilization processing apparatus including a plurality of processing units.

FIG. 7 is a block diagram showing an example of a continuous sterilization processing apparatus including a plurality of processing units. The apparatus shown in FIG. 7 includes three processing units 81A, 81B, 81C, each of which has the same structure as that of the processing unit 54 used in the apparatus shown in FIG. 3. The raw material supply pipe 53 is diverged into three branch pipes 82A, 82B, 82C on the downstream side of the filter 61. Front ends of the three branch pipes 82A, 82B, 82C are connected to liquid inlets of the three process units 81A, 81B, 81C, respectively. Also, the three branch pipes 82A, 82B, 82C are provided with valves 83A, 83B, 83C, respectively. On the other hand, liquid outlets of the three process units 81A, 81B, 81C are connected to branch pipes 84A, 84B, 84C for collecting products, respectively. The three branch pipes 84A, 84B, 84C are merged into one product collecting path 84 on the downstream side. The two branch pipes 84B, 84C are provided with three-way valves 85B, 35C. A connecting port of one of the first three-way valve 85B is connected to the branch pipe 82A through a bypass pipe 86B. In the same way, a connecting port of one of the second three-way valve 85C is connected to the branch pipe 82B through a bypass pipe 86C. The respective three-way valves 85B, 85C can switch their flow paths in two directions as shown by arrows A1 and A2. Operations of the above valves 83A, 83B, 83C and the three-way valves 85B, 85C and operations of the respective process units 81A, 81B, 81C, such as heating operation by heaters provided in the respective processing units, are controlled by a control device, not shown. The control device includes input devices for inputting information regarding the process, such as a kind and quantity of the liquid-form raw material to be processed; a kind of the process, such as sterilization, deactivation, deodorization; and in case the sterilization process is carried out, kind of a microorganism to be killed, so that a user can input.

In the apparatus shown in FIG. 7, the user can properly change the number of the processing units to be used and a flow path structure based on the information regarding the process inputted to the controlling device through the inputting devices. For example, in case a quantity of the liquid-form raw material to be processed is large, all three valves 83A, 83B, 83C are opened, and at the same time the directions of the three-way valves 85B, 85C are set to A1. When the flow paths are structured as described above, since the three processing units 81A, 81B, 81C are connected in parallel, a large quantity of the liquid-form raw material can be processed at the same time. Also, in case microorganisms to be killed are very strong, the first and second valves 83A, 83B are closed, the third valve 83C is opened, and directions of the three-way valves 85B, 85C are set to A2, respectively. Thus, since the three processing units 81A, 81B, 81C become a state where they are connected in series, the processing time becomes long to thereby positively kill even the strong microorganisms.

Incidentally, in the explanation for the apparatus shown in FIG. 3, it is mentioned that the time, i.e. process time, taken when the liquid-form raw material passes through the process unit 54 is from one minute to several minutes. However, in case plural processing units are provided as in the apparatus shown in FIG. 7, since it is enough that a sufficient processing time is taken in the whole processing units, the processing times taken by the respective processing units can be shortened than the above-mentioned processing time. Therefore, in case an apparatus formed of a plurality of processing units is structured, the processing units may have small process tanks instead of the processing units having the spiral heating wires.

As described above, when the critical process portion is formed of a plurality of processing units, a different temperature can be set for every processing unit. Taking advantage of this, for example, when a processing unit is shifted to the next processing unit and a temperature is suddenly changed, bacteria having a lower tolerance with respect to sudden temperature change are shocked to thereby be deactivated. Also, a different pressure may be set for every processing unit.

Incidentally, in the apparatus shown in FIG. 7, the critical process portion is structured by using a plurality of the same processing units as that of the apparatus shown in FIG. 3. In the same manner, in the apparatus shown in FIG. 1, the critical process portion may be formed of a plurality of the processing units.

Also, the dissolving portion may be structured by a plurality of independently operable units, i.e. solution units.

Figure 8:
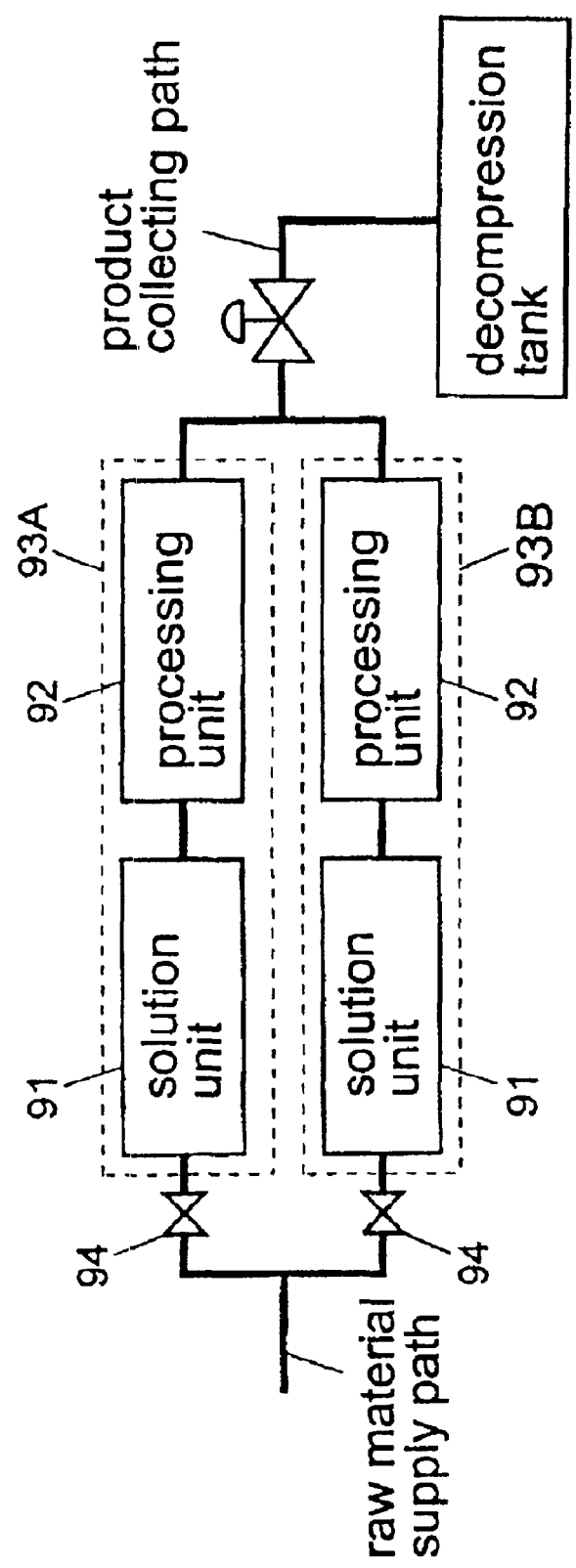
FIG. 8 is a block diagram showing a continuous processing apparatus, a part of which is structured by a plurality of units.
Figure 9:
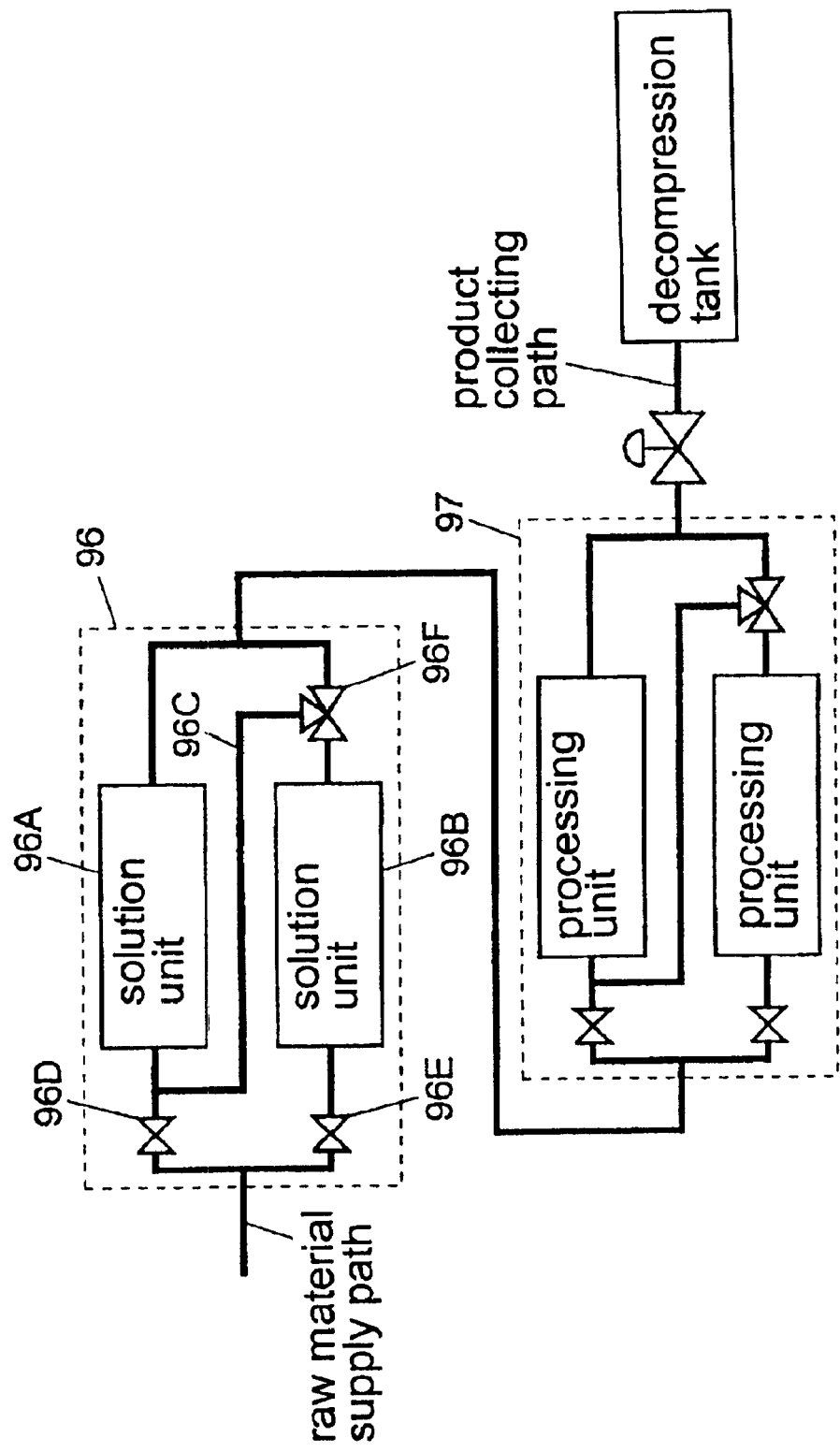
FIG. 9 is a block diagram showing another continuous processing apparatus, a part of which is structured by a plurality of units.

The other examples of the apparatus according to the present invention, wherein a part thereof is structured by a plurality of the independently operable units, are shown in FIGS. 8 and 9. Incidentally, FIGS. 8 and 9 show only essential parts including the solution portion, critical process portion and decompression portion of the apparatus according to the present invention, respectively.

In the apparatus shown in FIG. 8, two sets of solution and processing units 93A, 93B including solution units 91 and processing unit 92, respectively, are connected in parallel to the raw material supply pipe and the product collecting pipe. In the apparatus, either one or both of the solution and processing units can be selected as an operation unit or operation units by properly closing or opening valves 94 according to purpose of the process.

In the apparatus shown in FIG. 9, both solution portion 96 and critical process portion 97 are formed of a plurality of units. The solution portion 96 includes two solution units 96A, 96B, a bypass pipe 96C, two valves 96D, 96E and a three-way valve 96F. In the solution portion 96, the valves 96D and 96E are properly closed or opened according to the object of the process, and a direction of the three-way valve 96F is suitably changed, so that either one of the solution units can be selected as an operation unit, or two solution units can be connected in parallel or in series. The critical process portion 97 is also formed of two processing units and the like as in the solution portion 96, and a flow path structure can also be changed as in the solution portion 96.

Incidentally, it is a matter of course that various other unit structures are considered in addition to the structures as shown in FIG. 8 and FIG. 9.

Next, there is explained a structure wherein an acting or operation time of liquid carbon dioxide can be extended with respect to enzymes, bacteria or the like to be processed which are contained in the liquid-form raw material. For example, in order to extend the acting time of liquid carbon dioxide in the apparatus shown in FIG. 1, a baffle may be provided in the solution tank 11, or another tank, i.e. holding tank, for holding therein the liquid-form raw material in which liquid carbon dioxide has been dissolved for a predetermined time, may be disposed between the solution tank 11 and the heating wire 20. As described above, in case the acting time of liquid carbon dioxide is extended, since an efficiency of the critical process is raised, a structure of the critical process portion can be simplified. Therefore, instead of the spiral heating wire used in the above respective embodiments, for example, a tank can be used to constitute the critical process portion at a low cost.

Figure 10:
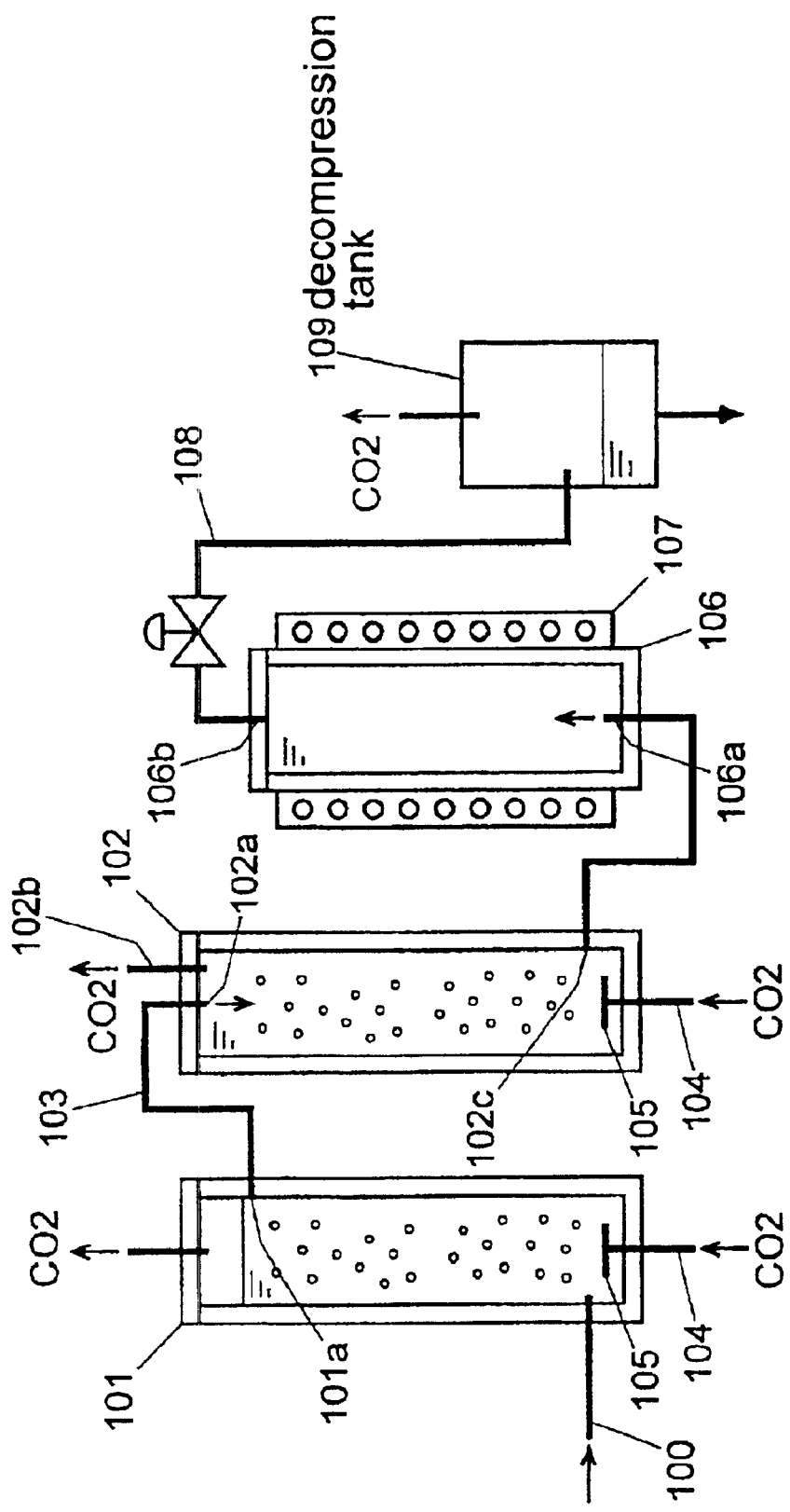
FIG. 10 is a block diagram showing an example of a continuous processing apparatus including a solution tank, a holding tank and a process tank.

FIG. 10 is a block diagram showing an example of a continuous processing apparatus including a solution tank, a holding tank and a process tank. In the apparatus shown in FIG. 10, a solution tank 101 has substantially the same structure as the solution tank 11 of the apparatus shown in FIG. 1. A holding tank 102 includes an introduction port 102a and a carbon dioxide discharge port 102b on an upper portion and a liquid outlet 102c on a lower portion thereof. The introduction port 102a of the holding tank 102 is connected to a liquid outlet 101a of the solution tank 101 through a pipe 103. Outlets of branch pipes 104 from a carbon dioxide supply pipe, not shown, are located at bottom portions of the solution tank 101 and holding tank 102, respectively, and mesh-type filters (which may be the same filter as that used in the apparatus shown in FIG. 1 or 3) 105 are provided to the outlets thereof, respectively. The process tank 106 includes an introduction port 106a at the bottom portion thereof and a liquid outlet 106b at the upper portion thereof. The process tank 106 is provided with a heater 107 for heating an interior thereof. A liquid outlet 106b of the process tank 106 is connected to a decompression tank (which may be the same as that used in the apparatus shown in FIG. 1 or 3) 109 through a product collecting pipe 108. Although a mechanism for feeding the liquid-form raw material to the solution tank 101, a mechanism for feeding liquid carbon dioxide to the solution tank 101 and the process tank 106 and a mechanism for collecting and recycling carbon dioxide discharged from the respective tanks are not shown, these mechanisms may be structured, for example, in the same manner as shown in FIG. 1.

In the apparatus as shown in FIG. 10, while the liquid-form raw material is continuously supplied to the solution tank 101 through a raw material supply path 100, fine bubbles of liquid carbon dioxide and the liquid-form raw material are subjected to a parallel flow contact in the solution tank 101 to thereby allow liquid carbon dioxide to dissolve in the liquid-form raw material. A theoretical value of a time for which the liquid-form raw material, i.e. constitutive molecules thereof, passes through the solution tank 101 can be obtained from a capacity of the solution tank 101 and a supplying flow amount of the liquid-form raw material, or the like. However, practically, when the fine bubbles of liquid carbon dioxide are elevated in the liquid-form raw material by a buoyancy, a part of the liquid-form raw material flows with the fine bubbles so that it passes through the solution tank 101 quicker than the other liquid-form raw material portion. Thus, the time for which the liquid-form raw material passes through the solution tank 101 is varied due to supply of liquid carbon dioxide. According to setting of supply quantities of the liquid-form raw material and liquid carbon dioxide, the dispersion of the passing time of the liquid-form raw material, as described above, may cause dispersions and lowering of a sterilization effect and an enzyme deactivation effect, which may result in a poor quality of products.

Therefore, in the apparatus as shown in FIG. 10, the liquid-form raw material taken out from the solution tank 101 is held in the holding tank 102 for a fixed time to thereby allow liquid carbon dioxide to sufficiently act on the enzymes and bacteria in the liquid-form raw material, in other words, to allow liquid carbon dioxide to sufficiently permeate into or act on proteins constituting the enzymes and bacteria. Thus, even if the liquid-form raw material passes through the solution tank 101 for a time shorter than the theoretical value, since the insufficient dissolution of liquid carbon dioxide in the solution tank 101 can be sufficiently compensated, the sterilization effect and the enzyme deactivation effect in the critical process step and decompression step can be sufficiently obtained. Further, in the apparatus shown in FIG. 10, the liquid-form raw material is subjected to a countercurrent contact with the fine bubbles of liquid carbon dioxide in the holding tank 102. In this method, according to flow of liquid carbon dioxide, i.e. fine bubbles thereof, the liquid-form raw material is properly stirred to thereby allow liquid carbon dioxide to be uniformly dissolved in the whole liquid-form raw material. Incidentally, it is not essential that the liquid-form raw material is subjected to the countercurrent contact with the fine bubbles of liquid carbon dioxide in the holding tank 102. A good effect can be obtained even when the liquid-form raw material is merely held in the holding tank 102 for a fixed time.

Although embodiments of the present invention have been explained hereinabove, the present invention is not limited to the above embodiments. For example, in the solution acceleration mechanism shown in FIG. 6, although the stationary-type mixer is used, it is also possible to structure the solution acceleration mechanism by a mixer with a stirring member. Also, instead of the filter, for example, fine bubbles of liquid carbon dioxide may be generated by using an ultrasonic generating apparatus. Further, in the above embodiments, although the heating wire 20 or 62 is shaped in a spiral form, the heating wire is not limited thereto and may be formed in any suitable shape. The invention is limited only by the appended claims.

What is claimed is:

1. A continuous processing method for continuously processing a liquid-form raw material, comprising:
   a dissolving step of continuously supplying liquid carbon dioxide into a continuously supplied liquid-form raw material to thereby dissolve the liquid carbon dioxide in the liquid-form raw material;
   a critical processing step of changing the carbon dioxide in the liquid-form raw material to one of a supercritical state and a subcritical state by holding the liquid-form raw material with the carbon dioxide under predetermined temperature and pressure;
   a decompressing step of decompressing the liquid-form raw material containing the carbon dioxide to thereby remove the carbon dioxide; and
   a collecting step of collecting the liquid-form raw material after the carbon dioxide is removed.

2. A continuous processing method according to claim 1, further comprising a holding step of holding the liquid-form raw material with the liquid carbon dioxide therein for a predetermined time before the critical processing step.

3. A continuous processing method according to claim 2, further comprising a recovery step of collecting the carbon dioxide at the decompressing step, said carbon dioxide recovered in the recovery step being cooled and supplied to the liquid-form raw material at the dissolving step.

4. A continuous processing method according to claim 3, further comprising a second recovery step of collecting the carbon dioxide after the dissolving step.

5. A continuous processing method according to claim 3, wherein in the critical processing step, the liquid-form raw material with the liquid carbon dioxide is maintained at 30–80° C. and 40–400 atm.

6. A continuous processing method according to claim 1, wherein while the liquid-form raw material is flowing in a flow path in the dissolving step, the carbon dioxide is supplied in the flow path to continuously dissolve the carbon dioxide in the liquid-form raw material.

7. A continuous processing apparatus for continuously processing a liquid-form raw material, comprising:
   a raw material supply section for continuously supplying a liquid-form raw material;
   a carbon dioxide supply section for continuously supplying liquefied carbon dioxide;
   a dissolution section communicating with the raw material supply section and the carbon dioxide supply section for dissolving the liquid carbon dioxide into the liquid-form raw material;
   a critical processing section communicating with the dissolution section for receiving the liquid-form raw material with the liquid carbon dioxide dissolved therein, said critical processing portion holding the liquid-form raw material with the liquid carbon dioxide under predetermined temperature and pressure to thereby change the liquid carbon dioxide to one of a supercritical state and a subcritical state; and
   a decompression section communicating with the critical processing section for suddenly decompressing the liquid-form raw material passing through the critical processing section so that the carbon dioxide is removed and a product is collected.

8. A continuous processing apparatus according to claim 7, further comprising a holding section for holding, for a predetermined time, the liquid-form raw material with the liquid carbon dioxide dissolved therein before the critical processing section.

9. A continuous processing apparatus according to claim 7, further comprising a recovery section connected to the decompression section for recovering the carbon dioxide at the decompression section and returning the carbon dioxide to the carbon dioxide supply section to reuse the recovered carbon dioxide.

10. A continuous processing apparatus according to claim 9, wherein said recovery section is also connected to the dissolution section for collecting carbon dioxide gas, and includes a recycling tank for keeping the recovered carbon dioxide.

11. A continuous processing apparatus according to claim 9, wherein said dissolution section is a tank containing the liquid-form raw material into which the liquid carbon dioxide is supplied.

12. A continuous processing apparatus according to claim 9, wherein said dissolution section is a part of a flow path where the liquid-form raw material flows, said liquid carbon dioxide being supplied to said part.

13. A continuous processing apparatus according to claim 12, wherein said dissolution section includes a plurality of dissolution units for supplying the liquid carbon dioxide to the liquid-form raw material.

14. A liquid-form substance processed by the method of claim 1 and collected at the collecting step.

* * * * *